Patented Nov. 7, 1922.

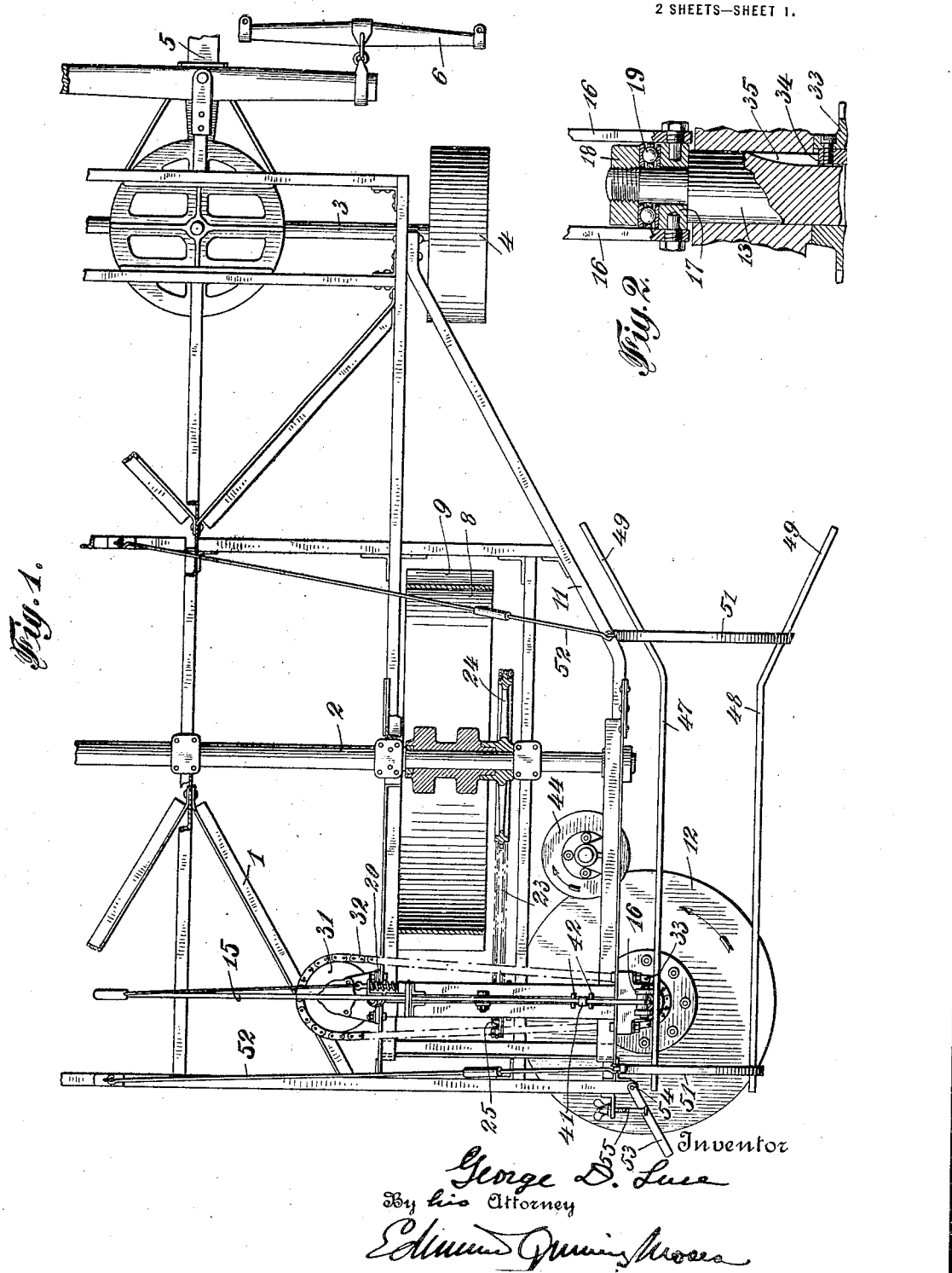

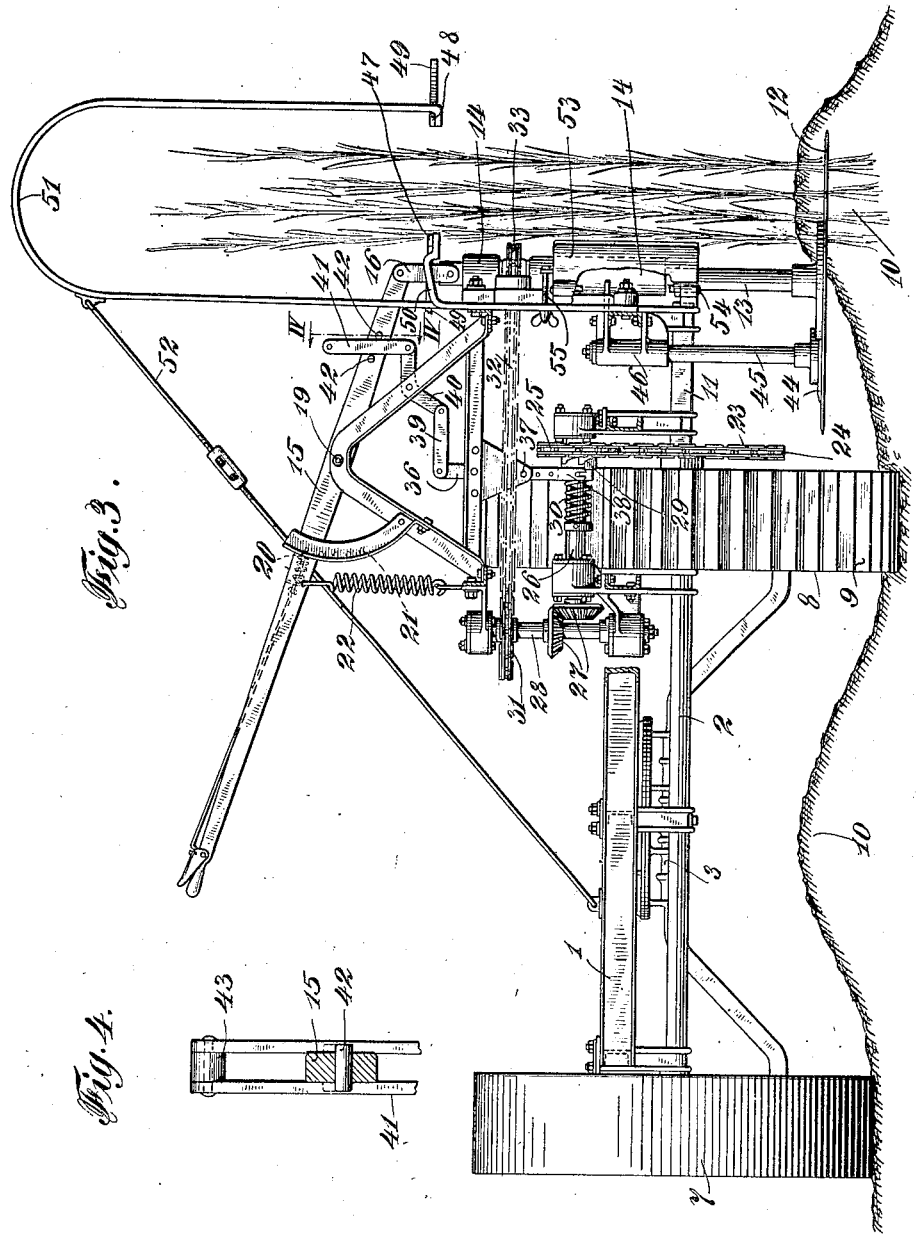

1,434,785

UNITED STATES PATENT OFFICE.

GEORGE D. LUCE, OF WATERTOWN, WISCONSIN.

SUGAR-CANE-WINDROWING MACHINE.

Application filed July 12, 1918. Serial No. 244,523.

*To all whom it may concern:*

Be it known that I, GEORGE D. LUCE, a citizen of the United States, residing at Watertown, county of Jefferson, and State of Wisconsin, have invented certain new and useful Improvements in Sugar-Cane-Windrowing Machines, of which the following is a specification.

This invention relates to machines for reaping or cutting sugar cane and the like and particularly to machines of this character adapted to cut the cane and lay it in windrows, although certain features of the invention may be employed in connection with more highly organized machines such as machines adapted to strip and top the cane as well as cut it. The invention has for its principal object the provision of a machine adapted to be drawn or propelled across the field and to cut the cane or the like clean and low, preferably actually below the surface of the ground so that there is no waste. The nature of the invention and various specific objects thereof more fully appear from the following description of one specific embodiment of the invention which I have chosen to illustrate the principle of the invention and the best mode now known to me for performing the same.

In the accompanying drawings which illustrate such specific embodiment Figure 1 is a plan view of the machine.

Figure 2 is a detail section of the swivel connection between the elevating lever and cutter shaft.

Figure 3 is a rear end view of the machine.

Figure 4 is a detail section of the elevating lever on line IV—IV of Figure 3.

Referring to the drawings in detail the numeral 1 designates a frame which may be of any suitable construction and which is mounted upon the rear axle 2 and the front axle 3. The front axle carries wheels 4 and in the particular construction illustrated means are provided for the attachment of draft animals at the front of the machine, a tongue 5 and whiffle-tree 6 being shown for this purpose. Obviously the machine may be arranged for propulsion in any other suitable manner. The axle 2 carries the wheels 7 and 8, the latter being a driving or bull-wheel and being provided with the cleats 9. The wheels are preferably spaced apart at such a distance that they will travel between adjacent rows of cane as indicated at 10 in Figure 3. At one side the frame 1 is provided with a laterally extended framework 11 which carries the cutting devices. As illustrated these comprise a large positively driven sharp edged disk cutter and a smaller disk cutter cooperating therewith but not positively driven.

The positively driven disk which is shown at 12 is arranged to be rotated about a substantially vertical axis and is preferably mounted for vertical adjustment so as to regulate the depth of the cut. In the construction illustrated the disk 12 is fixed to the lower end of a shaft 13 which is mounted for both rotary and axial movement in the bearings 14. The axial movement of the shaft is controlled by suitable means such as a lever 15 having at its end a pair of links 16, between the lower ends of which is suspended a collar 17 through which passes the upper end of the shaft 13. A nut 18 screwing on the end of the shaft retains the collar in position, a ball thrust bearing 19 being preferably interposed between the nut and collar. The lever 15 is fulcrumed to the frame and is preferably provided with means for locking the same in adjusted position such as the pawl 20 engaging notches in the segment 21. If desired a spring 22 may be provided for counter-balancing the weight of the shaft and disk. The rotation of the disk cutter 12 may be caused by power from any suitable source. In the construction illustrated the power is derived from the rotation of the bull-wheel 8 through the chain 23 passing about a sprocket 24 on the bull-wheel and a sprocket 25 mounted on a counter shaft 26 which by means of the beveled gearing 27 drives a vertical shaft 28. The sprocket 25 is preferably freely rotatable on the countershaft but may be connected to drive the same by means of a ratchet clutch 29, one member of which is attached to the sprocket, while the other member is splined to the shaft. The clutch members are normally held in engagement by a spring 30 which, however, will yield to permit the clutch teeth to disengage if the bull wheel is rotated backwards. The vertical shaft 28 carries a sprocket 31 which through a chain 32 drives a sprocket 33 mounted on the shaft 13. The sprocket 33 is held against vertical movement between the bearings 14, the shaft 13 being free to move axially through the sprocket which, however, transmits rotary movement to the shaft by means of a feather 34 working in the spline 35 in the shaft. (See Fig. 2.) Manual means are preferably provided for disengaging the clutch members 29, the construction illustrated for this purpose comprising a connection from the lever 15 to the clutch so that when the lever is fully depressed to elevate the cutter to inoperative position the clutch will be disengaged so as to stop the rotation of the cutter. As shown, a lever 36 is pivoted at 37 to a bracket on the frame and has a fork 38 engaging the clutch member on the counter shaft. The lever 36 at its upper end is connected by a link 39 to a bell crank 40 to which is attached a double link or loop member 41 through which passes the lever 15. The loop member 41 is maintained in a substantially vertical position by pins 42 on the lever 15 and at its upper end has a cross piece 43 which is adapted to be engaged by the lever when near the upward limit of its movement so that further movement of the lever will pull up on the loop and so disengage the clutch.

In combination with the main positively driven disk cutter 12 I preferably employ an auxiliary disk cutter 44 fixed to the lower end of a shaft 45 which is freely mounted for both rotary and axial movement in the bearing 46. The cutter 44 is preferably located in front and somewhat to one side of the axis of the main cutter and partly overlaps and rests upon the main cutter. It is thus supported in substantially the same plane as the main cutter and moves up and down with the same. It receives its rotation from the main cutter and from contact with the cane.

In order to guide the cane to the cutter and steady it as it is being cut and to assist in depositing it in windrows I preferably provide a pair of guide rails 47 and 48 flaring outwardly in front as indicated at 49 so as to receive all the cane of a row between them. The inner guide rail is supported from the frame in any suitable manner as by means of the bracket arms 50, while the outer guide rail is preferably supported by means of the arch bars 51 which are extended high enough to permit the tops of the cane to pass under them. These bars may be steadied if necessary by stay rods 52. A fender 53 hinged to the frame at 54 and held in the proper angular adjustment by a screw 55 may be provided, if desired, to assist in throwing the cane over in windrows although the fender is not in all cases necessary.

The cutting disk 12 owing to its positive rotation cuts the cane cleanly and may also be adjusted so as to cut the cane at the very base of the stalk, thereby saving every bit of the juice producing material which is very important as it is known that the lower part of the stalk is the more productive. Preferably the cutter is adjusted so as to pass through the upper part of the hill so as actually to cut the cane below the surface of the ground. The means of adjusting the disk cutter vertically permit the maximum depth of cut to be attained at all times. The machine is also constructed in such a way that the cutting means are supported laterally of the wheels so that the machine travels over the cut portion of the field and severs the cane at one side of the line of travel. The axes of the main and auxiliary cutting disks are also at one side of the cane to be cut, the principal part of the actual cutting being performed by the portion of the main disk edge which is outside of the axis of the disk. It is also to be noted that the main disk is rotated in such a direction that the active part of the edge is moving towards the supporting wheels of the machine and towards the auxiliary cutter, the preferred direction of rotation being indicated by the arrow shown in Figure 1. This direction of rotation improves the action of the cutter upon the cane as there is less tendency to force the cane out of position instead of actually cutting it. Furthermore, any canes which are displaced by the movement of the main disk cutter, especially the canes on the insides of the hills or rows, are brought in contact with the auxiliary cutter which cooperates with the main disk to sever them clean and prevent the destruction of the hill.

While I have described and illustrated in detail but one preferred embodiment of my invention it will be understood that modifications may be made therein and I do not intend therefore to limit myself to the precise construction shown, but desire to cover my invention broadly in whatever form its principle may be embodied.

Having thus described my invention I claim:—

1. In a machine of the character described, the combination of a frame adapted to be moved across a field, a rotary disc cutter mounted outside of said frame, and means for rotating said cutter to cause the active cutting portion thereof to rotate in a forward direction.

2. In a machine of the character described the combination of a frame adapted to be moved across a field, supporting means at one side thereof, and a rotary disc cutter mounted upon said supporting means, the active cutting portion of said cutter extending laterally and outwardly beyond said supporting means, and means for rotating said cutter.

3. In a machine of the character described, the combination of a frame adapted to be moved across a field, supporting means at one side thereof, and a rotary disc cutter mounted upon said supporting means, the active cutting portion of said cutter extending laterally and outwardly beyond said supporting means, said cutter being mounted for vertical adjustment, and means for rotating said cutter.

4. In a machine of the character described the combination of a frame adapted to be moved across the field, bearings at one side of the frame, a substantially vertical shaft carried in said bearings and capable of rotation and axial movement therein, a disk cutter mounted on the lower end of said shaft, means for positively rotating said shaft and means for moving said shaft axially in its bearings.

5. In a machine of the character described the combination of a frame adapted to be moved across the field, bearings at one side of the frame, a substantially vertical shaft carried in said bearings and capable of rotation and axial movement therein, a disk cutter mounted on the lower end of said shaft, means for positively rotating said shaft and means for moving said shaft axially in its bearings, said last-named means comprising a lever extending laterally of the frame and fulcrumed thereon and engaging said shaft at its outer end.

6. In a machine of the character described the combination of a frame adapted to be moved across the field, a disk cutter mounted laterally of said frame, means for rotating said cutter about a substantially vertical axis, and means for guiding the cane over the outer part of the cutter, outside of the axis thereof.

7. In a machine of the character described the combination of a frame adapted to be moved across the field, a large positively driven disk cutter mounted thereon and located adjacent to the ground surface, means for rotating said cutter about a substantially vertical axis and means for guiding the cane into engagement with the cutter at one side of the axis thereof.

8. In a machine of the character described the combination of a frame adapted to be moved across the field, a substantially vertical shaft mounted at one side of said frame, a disk cutter attached to the lower end of said shaft, means for positively rotating said cutter and means for guiding the cane into engagement with that part of the edge of the cutter which is for the time being rotating forwardly and towards a plane passing through the axis of the cutter in the direction of travel.

9. In a machine of the character described the combination of a frame adapted to be moved across the field, a cutter carried thereby, means for positively rotating said cutter about a substantially vertical axis and means for guiding the cane into engagement with that part of the edge of the cutter which is for the time being rotating forwardly and towards a plane passing through the axis of the cutter in the direction of travel.

10. In a machine of the character described the combination of a frame adapted to be moved across the field, a substantially vertical shaft mounted at one side of said frame, a disk cutter attached to the lower end of said shaft, means for positively rotating said cutter, and guide rails carried by said frame at some distance above said cutter and extending rearwardly outside of said shaft.

11. In a machine of the character described the combination of a frame adapted to be moved across the field, a substantially vertical shaft mounted at one side of said frame, a cutter mounted on the lower end of said shaft, means for positively rotating said shaft, a pair of guide rails mounted on said frame above said cutter, the forward parts of said rails being inclined to the direction of travel of the machine and the last parts of said rails being substantially parallel with said direction of travel, said rails passing over said cutter and outside of said shaft.

12. In a machine of the character described the combination of a frame adapted to be moved across the field, a substantially vertical shaft mounted at one side of said frame, a cutter mounted on the lower end of said shaft, means for positively rotating said shaft, a pair of guide rails mounted on said frame above said cutter and passing over said cutter and outside of said shaft, and an outwardly and rearwardly sloping fender in rear of said cutter.

13. In a machine of the character described the combination of a frame adapted to be moved across the field, a disk cutter mounted laterally of said frame, means for rotating said cutter about a substantially vertical axis, and means for guiding the cane over the outer part of the cutter, outside of the axis thereof, said means comprising a pair of guide rails extending longitudinally over the outer part of the cutter, the outer of said rails being carried by supports extending over the tops of the cane to be cut.

14. In a machine of the character described the combination of a frame mounted on wheels adapted to travel between rows from which the cane has been cut and a rotary disk cutter mounted at one side of said frame and adapted to cut the cane of another row, the outer portion of the cutter extending laterally beyond the frame, and guide rails extending longitudinally over the outer portion of the cutter, the inner guide rail being carried by the frame and the outer guide rail by supports extending upwardly from the frame, outwardly over the tops of the cane in the row to be cut and downwardly to the guide rail.

15. In a machine of the character described the combination of a frame adapted to be moved across the field, a large disk cutter mounted thereon for rotation about a substantially vertical axis, and a small disk cutter mounted adjacent to the large disk cutter and adapted to co-operate therewith, said small disk cutter being mounted for rotation about a substantially vertical axis, said small disk cutter being positioned in advance of said large disk cutter and to one side of the axis thereof.

16. In a machine of the character described the combination of a frame adapted to be moved across the field, a substantially vertical shaft mounted at one side of said frame, a disk cutter attached to the lower end of said shaft, means for positively rotating said cutter, means for guiding the cane into engagement with that part of the edge of the cutter which is for the time being rotating forwardly and towards a plane passing through the axis of the cutter in the direction of travel, and a second disk cutter located in co-operative relation to the aforesaid disk cutter and mounted for free rotation about a substantially vertical axis located in front of the axis of the first disk cutter and beyond said plane in the direction of travel of the forward cutting edge of said first disk cutter.

17. In a machine of the character described the combination of a frame adapted to be moved across the field, a disk cutter carried at one side thereof and mounted to rotate about a substantially vertical axis, means for supporting said cutter so that its cutting portion will extend laterally through the upper part of the earth forming a hill or row whereby it will cut the cane below the surface of the ground, and means for positively rotating said cutter.

GEORGE D. LUCE.